3,636,136
METHOD OF POWDERING POLYAMIDES WITH HYDROLYZED ETHYLENE/VINYL ACETATE COPOLYMERS
Alvin E. Konopik, Newark, Del., assignor to E. I. du Pont de Nemours and Company, Wilmington, Del.
No Drawing. Filed Nov. 18, 1969, Ser. No. 877,852
Int. Cl. C08g 41/04
U.S. Cl. 260—857 L      9 Claims

ABSTRACT OF THE DISCLOSURE

Polyamides having melt indices in the range of 0.01 to 2000 are powdered by grinding in standard grinding equipment using as grinding aid about 1 to 100 percent by weight, based on the polyamide, of about 50–100 percent alcoholyzed ethylene/vinyl ester copolymer which, before being alcoholyzed, contained about 70 to 98 mole percent ethylene and about 2 to 30 mole percent vinyl ester. The resulting compositions are useful for preparing nylon color concentrates and, when the polyamide is relatively low melting, they are particularly useful as textile fusible adhesives.

BACKGROUND OF THE INVENTION

(1) Field of the invention

This invention relates to a method of grinding polyamides having a melt index of less than about 2000, to the resulting finely divided compositions, and to their use as textile fusible adhesives and in the preparation of nylon color concentrates.

(2) Description of the prior art

Polyamides having a melt index of less than about 2000 are commercially available in finely divided form. Because polyamides are extremely tough, they are difficult to grind into powders even when using the best commercially available grinding equipment. Accordingly, polyamides in finely divided form are relatively expensive, as compared to the same product in granular form, because they grind at an extremely slow grinding rate.

Polyamides have been produced in powdered form heretofore by chilling the polymer below its glass transition temperature in liquid nitrogen or by adding solid carbon dioxide and grinding by brittle fracture. Although these grinding techniques provide faster grinding rates, they introduce other factors which themselves are expensive.

In recent years there has been considerable interest in joining pieces of textile material by the use of polymeric adhesives. Useful polymers must be low temperature fusible and have good adhesive and toughness properties. These adhesives may be applied in a variety of forms such as films, threads, woven and nonwoven fabrics, and powders. Low melting polyamides have been found to be excellent adhesives for this application. One disadvantage of low temperature fusible polyamides, however, is that they cannot be economically produced in the form of the finely divided powder which is required for application by the popular sprinkle finish technique.

Another area in which finely divided polyamides would be useful if they could be economically produced is in the preparation of nylon color concentrates. Nylon color concentrates are prepared by milling powdered polyamide on a rubber mill with suitable pigments. Milling of granular polyamide with powdered pigment requires considerable time because of the difficulty in obtaining a homogeneous dispersion of finely divided pigment and the nylon. Use of powdered nylon allows better premixing of the finely divided nylon and pigment and reduces milling time at the fluxing temperature. Reduction in fluxing time is important because polyamides are slowly degraded by continued heating.

SUMMARY OF THE INVENTION

It has now been discovered that polyamides having melt indices in the range of 0.1 to 2000 can be powdered at an improved rate by the process which comprises grinding said polyamide in the presence of about 1 to 100 percent by weight, based on the polyamide, of about 50 to 100 percent alcoholyzed ethylene/vinyl ester copolymer which, before being alcoholyzed, contained 70 to 98 mole percent ethylene and 2 to 30 mole percent vinyl ester. The resulting finely divided polymer composition comprises polyamide and about 1 to 100 percent by weight, based on the polyamide, of alcoholyzed ethylene/vinyl ester copolymer and has an average particle size diameter of about 20 to 1000 microns.

A particularly preferred composition is one in which the polyamide has a melt index of 0.1 to 100, contains repeat units derived by weight 0 to 45 percent from the condensation of hexamethylene diamine and adipic acid, 0 to 65 percent from the condensation of hexamethylene diamine and polymethylene diacid of 10 to 12 carbons, and 20 to 75 percent from 6-aminocaproic acid, and has a melting point of less than 170° C.; the vinyl ester is vinyl acetate; and the alcoholyzed ethylene/vinyl acetate copolymer is present in the amount of 2 to 75 percent by weight, based on the polyamide.

DESCRIPTION OF THE INVENTION

The grinding process of this invention is suitable for the grinding of polyamides having melt indices of less than about 2000. These polyamides, commonly called nylons, include the polymers made by the intermolecular condensation of linear diamines containing about 6 to 20 carbon atoms with linear dicarboxylic acids containing about 2 to 48 carbon atoms. They also include polymers made by the intermolecular polymerization of omega-aminoacids containing about 4 to 18 carbon atoms.

These polyamides tend to be extremely tough and thus are difficult to grind. Grinding is particularly difficult when the polyamide has a relatively low melting point. Accordingly, this grinding process is particularly useful when the polyamide has a melting point of less than about 200° C. and most useful when the melting point is less than about 170° C.

The melting points described herein are measured by the well-known differential thermal analysis method, hereinafter referred to as DTA. In accordance with this method a crystalline sample is heated at a constant rate, for example, at 10° C. per minute, and the difference in sample temperature as compared with an inert non-crystalline sample in the same environment is recorded as a function of temperature. The peak temperature, that is, the temperature at which the differential temperature is maximum, is taken as the DTA melting point. Since polyamides having a low degree of crystallinity can be readily quenched to an amorphous state by rapidly cooling from above the melting point, the sample should be preconditioned so as to attain the crystalline state. Accordingly, the DTA melting point is determined using a dry specimen which has cooled from above its melting point at the rate of 1° C. per minute or less.

A preferred class of polyamides for use in the process of this invention includes those containing repeat units derived by weight about 0 to 45 percent from the condensation of hexamethylene diamine and adipic acid, about 0 to 65 percent from the condensation of hexamethylene diamine and a polymethylene diacid of 10 to 12 carbons, and about 20 to 75 percent from 6-aminocaproic acid. These polyamides have melting points of less than about 170° C. and thus are particularly useful as textile fusible adhesives. By "repeat units" is meant polymer units of the structure

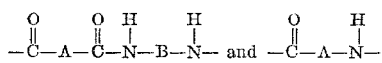

in which A and B are the same or different polymethylene groups.

A particularly preferred class of polyamides includes those containing repeat units derived by weight about 0 to 35 percent from the condensation of hexamethylene diamine and adipic acid, about 5 to 50 percent from the condensation of hexamethylene diamine and polymethylene diacid of 10 to 12 carbons, and about 25 to 65 percent from 6-aminocaproic acid. These preferred polyamides have melting points of less than about 150° C.

With regard to the above-described polyamides it is not necessary that the recited polyamide-forming monomers be used per se in the polymerization reaction. It is necessary only that the repeat units in the polyamide correspond to those derived from the recited monomers. The actual materials used in the polymerization reaction may be the recited monomers or polyamide-forming derivatives of these monomers, such as the acid chloride, ammonium salt, ester, half-ester, and the like. Suitable polymethylene diacids of 10 to 12 carbons include sebacic and dodecanedioic acids. Caprolactam may be used in place of 6-aminocaproic acid.

Suitable methods of preparing polyamides are well known to those skilled in the art. For example, the preparation of polyamides by melt condensation is described in U.S. Pat. No. 2,252,555. The reaction is carried out by heating diacid, diamine and/or amino acid, or their polyamide-forming derivatives, at temperatures of about 150° to 300° C. while driving off water, and continuing the reaction until the desired molecular weight is obtained. The functional groups at the end of the polymer chain will be carboxylic acid and amine, one of which may be in slight excess depending upon which reactant was present in excess.

The molecular weight of a polyamide is quantitatively related to its melt viscosity. Molecular weights are commonly indicated by the melt index which is an empirical measurement of inverse melt viscosity measured according to ASTM Test Method D-1238-65T. All melt index values used herein are obtained with the standard orifice at 190° C. using the 2160 gram weight, equivalent to 43.25 p.s.i. differential pressure. The melt index is the number of grams extruded in 10 minutes. The melt index of polyamides used herein should be at least about 0.01 to provide processability and less than about 2000 in order to provide adequate strength and toughness. Preferably, the melt index of the polyamide is about 0.1 to 100.

The alcoholyzed ethylene/vinyl ester copolymers used as grinding aids in accordance with this invention are derived from copolymers which, before being alcoholyzed, contained about 70 to 98 mole percent ethylene and about 2 to 30 mole percent vinyl ester. Suitable vinyl esters for preparing these copolymers include lower vinyl esters, such as vinyl formate, vinyl acetate, vinyl propionate, vinyl butyrate, as well as higher vinyl esters such as vinyl palmitate and vinyl stearate. Vinyl acetate is the preferred vinyl ester for economic reasons. Preferably, the copolymer contains 75 to 95 mole percent ethylene and 5 to 25 mole percent vinyl acetate prior to being alcoholyzed.

Methods of preparing the ethylene/vinyl acetate copolymer precursors of the grinding aids used herein are well known to those skilled in the art as illustrated in U.S. Pats. Nos. 2,200,429 and 2,703,794. Suitable methods include high pressure polymerization and catalytic polymerization using free radical, ionic, and Ziegler type catalysts. According to commercial practice the resulting copolymer is pelletized by any of the known polymer cutting techniques such as strand cutting, melt cutting, dicing, etc. Common pellet sizes correspond in volume to spheres having diameters of about ⅙ to ¼ inch.

The ethylene/vinyl ester copolymer should be about 50 to 100 percent alcoholyzed. By "50 to 100 percent alcoholyzed" it is meant that 50 to 100 percent of the acyl groups in the original copolymer are replaced by hydroxyl groups. These acyl groups may be alcoholyzed, that is, converted to hydroxyl groups, by any of the well-known methods including alcoholysis, hydrolysis or saponification. A suitable method of alcoholysis is described in British Pat. No. 1,095,204. Preferably, the ethylene/vinyl ester copolymer is 75 to 100 percent alcoholyzed.

Improvement in the rate of grinding polyamides can be obtained with as little as about 1 percent by weight, based on the polyamide, of alcoholyzed ethylene/vinyl ester copolymer. When more than about 100 percent of alcoholyzed copolymer is present, no further significant improvement in grinding rate is achieved. Preferably, about 2 to 75 percent by weight of copolymer, based on the polyamide, is present. Within this range substantial improvement in grinding rate is obtained. Most preferably, about 3 to 50 percent of copolymer, based on the polyamide, is present.

Any convenient equipment for grinding the polyamide may be used. Improvements in grinding rate of the order of about 2 to 3 times, or more, have been achieved in accordance with this invention when using as little as 5 percent of the alcoholyzed copolymer grinding aid. Not only is the grinding rate improved in accordance with this invention, but in many types of grinding equipment, no sustained grinding rate can be obtained for many polyamides unless the grinding aid of this invention is present.

The method by which the grinding aid disclosed herein functions to improve the grinding rate of the polyamide is not fully understood. When using the grinding aid, the temperature of the product being discharged from the grinder can be allowed to rise without causing the product to agglomerate in the grinder. This in turn allows greater energy input to the grinder and increased grinding rates.

The finely divided compositions of this invention are useful in the preparation of color concentrates which are used in the coloration of nylon used to prepare fibers and molded plastic products. These color concentrates are prepared by milling the finely divided polymer composition of this invention with suitable organic dyes or organic or inorganic pigments. Suitable pigments include inorganic pigments such as rutile and anatase titanium dioxides, cadmium sulfides and sulfo-selenides, lead antimonate, nickel and chromium titanates, mercury cadmiums, chromates of nickel, tin and lead, ceramic greens such as chromium, cobalt, titanium and nickel oxides, ceramic blacks such as chromium, cobalt and iron oxides, carbon black and ultramarine blue. Suitable organic pigments include phthalocyanine blues and greens and quinacridones. Suitable dyes include acid dyes such as sulpho rhodamine B and basic dyes such as the indoline bases.

Polyamides melting below about 170° C. and more particularly, below about 150° C. are preferred for preparing color concentrates. These polyamides flux at a lower temperature thus providing a less severe thermal history for the polyamide and allowing the use of a wider variety of dispersing equipment. There is also less chanve of degrading the colorant when the dispersing is carried out at a relatively low temperature.

The amount of colorant contained in the color concentrate may vary over wide limits. When it is important to minimize dilution of the nylon to which the color concentrate is added, a color concentrate having a maximum amount of colorant and a minimum amount of polyamide is desired. In this case the color concentrate could contain up to about 80 percent by weight of pigment, based on the total color concentrate. The color concentrate is then let down into the desired nylon such as nylon 6, 66 or 610 to achieve the desired pigment level. When the colorant is a dye, the colorant content of the color concentrate may be as low as about 0.1 percent since considerably less dye may be required in the final product, particularly when it is a tinted product. The preferred color concentrates are those containing about 10 to 75 percent by weight of finely divided pigment, and most commonly about 15 to 30 percent pigment.

The color concentrate is commonly let down using conventional polymer extrusion equipment. The concentration of pigment in the final fiber or molded article is generally about 0.01 to 1.0 part by weight of pigment per hundred parts of resin.

In addition to colorants, the color concentrate may also contain any of the other additives typically employed in polyamide technology including molding aids such as those described in U.S. Pats. Nos. 2,948,698 and 3,009,900; nucleating agents such as those listed in U.S. Pat. No. 3,080,345; heat stabilizers such as those described in U.S. Pat. No. 2,705,227; antioxidants such as those listed in Modern Plastics Encyclopedia, vol. 45, No. 14A (McGraw-Hill Inc., October 1968), pages 505–507; antistatic agents such as those listed in Modern Plastics Encyclopedia, ibid., pages 500–501; flame retardants such as those described in U.S. Pats. Nos. 3,418,267; 3,440,211 and 3,468,843; fibrous, spherical and other forms of fillers and reinforcing agents, and the like, and mixtures thereof.

The finely divided compositions of this invention which contain relatively low melting polyamides are also useful as textile fusible adhesives which can be applied by the sprinkle finish technique. By this technique a coating of the finely divided polyamide composition is applied to the surface of a piece of textile material. At this stage the coating may be heated at a temperature above the melting point of the composition, if desired, to fuse the finely divided particles. The coating is then overlayed with a second piece of textile material and heat and sometimes pressure are applied, such as by ironing, thereby sealing together the two pieces of textile material. For this use the particles should have an average diameter of about 20 to 1000 microns. Preferably, the particles have an average diameter of about 100 to 800 microns.

The finely divided polyamide compositions of this invention are also suitable for other uses as will be apparent to those skilled in the art. For example, they are especially suitable for use in the fluidized bed coating of suitable objects. In this process the object to be coated is heated and then suspended in a fluidized bed of finely divided particles of this invention. The heat causes the polymer particles to adhere to the object and fuse together to form a coating.

EXAMPLES OF THE INVENTION

The following examples, illustrating the novel grinding process and compositions of this invention, are given without any intention that the invention be limited thereto. All parts and percentages are by weight.

EXAMPLE 1

A polyamide was prepared as follows: To an autoclave was charged the following materials.

| | Parts |
|---|---|
| Hexamethylene diammonium adipate | 270 |
| Hexamethylene diammonium sebacate | 864 |
| ε-Caprolactam | 801 |
| Hexamethylene diamine | 5.9 |
| Acetic acid | 1.0 |
| Water | 1860 |

The charge was heated under autogenous pressure to 250 p.s.i.; water was evaporated; and finally pressure was reduced to 26 inches of mercury vacuum while raising the temperature to 267° C. The polymer melt was extruded and chopped into about ⅛ inch granules. The polymer had a DTA melting point of 134° C. and a melt index of 2.8. Polymer ends were analyzed and found to be $40 \times 10^{-6}$ eq./g. of carboxy-ends and $65 \times 10^{-6}$ eq./g. of amine-ends. The above composition corresponds to 14.1 mole percent nylon 66, 37.3 mole percent nylon 610, 48.6 mole percent nylon 6, based upon two carboxyamide groups per mole, that is, defining two caprolactam repeat units as one mole.

A copolymer of ethylene and vinyl acetate containing 82 mole percent ethylene and 18 mole percent vinyl acetate and being in the form of approximately ⅛ inch beads was alcoholyzed as follows: One hundred parts of copolymer were suspended in 226 parts of methanol with 6.8 parts of sodium methoxide and heated from 50° to 64° C. over a period of 2 hours followed by heating at reflux for 3 hours. The resulting copolymer was 95 percent alcoholyzed.

(A) Grinding of a 75/25 percent polyamide/copolymer mixture was carried out as follows: Six hundred pounds of the above polyamide and 200 pounds of the above alcoholyzed ethylene/ vinyl acetate copolymer were mixed and then fed to the feed hopper of a grinder which consists of 2 counter-rotating discs with variable tip clearances, both discs being milled and having close clearance for the outer 3 inches of their diameters. The discs are about 30 inches in diameter and rotate at 3600 revolutions per minute in opposite direction giving a relative tip speed of about 56,000 feet per minute. Clearance between the two discs decreases slightly across the milled section toward the outside, providing a smaller and smaller cross-section for a particle to escape through as it proceeds out between the two discs. The V grooves milled in the disc are pitched about 5° in the reverse of the direction of rotation causing the material to be driven out more rapidly than discs with non-pitched grooves.

The material was fed to the grinder through the center of the disc so that all material passed outwardly through the clearance of the disc. The material was carried by air pulled into the grinder by the disc as air in-leakage. The air rate was 3,000 cubic feet per minute at a temperature of between 13° and 15° C. A duct skin temperature limit of 60° C. was maintained on the duct approximately 2 feet above the exit of the grinder.

The ground material was conveyed up through a cyclone separator in which the particles were separated from the air stream and the particles were dropped on a 25 U.S. mesh size screen. The particles which did not pass through the screen were sent back to the grinder as recycle. The ground material which passed through the 25 mesh screen was selected as product. The grinding rate was 360 pounds per hour.

(B) The grinding procedure of (A) above was repeated using a mixture of 1045 pounds of the above polyamide and 55 pounds of the above alcoholyzed ethylene/ vinyl acetate copolymer. The grinding rate for this 95/5 percent polyamide/copolymer blend was 180 pounds per hour.

(C) For comparison, 1000 pounds of the above polyamide containing no alcoholyzed ethylene/vinyl acetate copolymer was charged to the grinder. Introduction of fresh feed was stopped when the duct temperature rose to 38° C. At this point recycle feed was continued and, when the duct temperature dropped to 35° C., fresh feed was automatically introduced into the grinder with the recycle feed. The sustained grinding rate was only 60 pounds per hour.

(D) For further comparison, the procedure of (C) above was repeated except that the duct temperature was allowed to rise to 40.5° C. The polymer became tacky and matted together whereby no sustained grinding rate could be achieved.

EXAMPLE 2

(A) A color concentrate containing 50 percent by weight pigment was prepared as follows: Seventy-five grams of finely divided Monastral® Green B, GT–710–D pigment and 75 grams of the finely divided polyamide/ copolymer composition prepared in Example 1(A) were placed in a quart can and thoroughly mixed by shaking for 5 minutes on a Red Devil® shaker. The resulting mixture was banded on a two-roll rubber mill operating with the front roll at a temperature of 138° C. and at a speed of 10 r.p.m. while the back roll was at 132° C. and a speed of 15 r.p.m. The nip opening between the rolls was 5 mils. Banding was continued for several minutes until the material was well fluxed. The speed of the rolls was then changed so that the front roll was at 25 r.p.m. and the back roll was at 15 r.p.m. and the nip opening was adjusted to 25 mils. The milling was continued for an additional 10 minutes during which the time the stock was cut with a knife and returned to the mill to provide a homogeneous dispersion. The stock was then sheeted off and the sheet was broken into small pieces.

A small portion of the pieces of dispersion was placed between two plates, inserted into a press and reduced by heating and a pressure of about 50 tons to a thin film of about 5 mils thickness. The quality of the dispersion was examined by holding the film up to intense light and using a microscope having a magnification of about 45. These examinations indicated that a good dispersion of pgiment had been obtained.

(B) The above color concentrate containing 50 percent pigment was let down on a mill as follows: One hundred parts of the finely divided polyamide/copolymer composition prepared in Example 1(A) were added to a two-roll rubber mill. A small amount of the above color concentrate (0.4 part) was added to the mill and banding was carried out as described above until a homogeneous dispersion was obtained. The final dispersion, which contained 0.2 part of pigment per 100 parts of resin, was examined as described above and found to be a good dispersion of pigment in polyamide.

(C) The color concentrate prepared in (A) above containing 50 percent pigment was let down in an extruder as follows: To a polyethylene bag was added 120 parts of small pieces of the color concentrate and 480 parts of the finely divided polyamide/copolymer composition prepared in Example 1(A). The dry blend was shaken in the polyethylene bag until it was thoroughly mixed. The resulting mixture was added to a 1 inch Killion extruder having a varying pitch, flighted torpedo screw; a spaghetti die, a single 30 mesh screen pack ahead of the die and cooling water on the hopper. The extrudate was passed though chilled take off rolls. The die temperature was set at 177° C. The barrel temperatures were 149° C. in the rear zone, 177° C. in the center zone and 182° C. in the front zone. The speed control dial was set at 4, the percent of maximum r.p.m. was 18 and the indicated pressure was 700–750 p.s.i.g. A good 10 percent dispersion was obtained. The spaghetti product was reduced in size by cutting with scissors.

(D) The above let down containing 10 percent pigment was further let down to 1 percent pigment as follows: To a polyethylene bag was added 100 parts of small particles of the 10 percent let down prepared above and 900 parts of the finely divided polyamide/copolymer composition prepared in Example 1(A). The dry blend was thoroughly mixed and fed to the hopper of the extruder described in (C) above. The quality of the resulting dispersion was examined as described in (A) above. A good 1 percent dispersion was obtained.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. The method of powdering a polyamide having a melt index in the range of 0.01 to 2000 which comprises grinding said polyamide at temperatures above brittle fracture in the presence of 1 to 100 percent by weight, based on the polyamide, of 50–100 percent alcoholyzed ethylene/ vinyl ester copolymer which, before being alcoholyzed, contained 75 to 98 mole percent ethylene and 2 to 25 mole percent vinyl ester.

2. The method of powdering of claim 1 in which the polyamide has a melt index of 0.1 to 100, contains repeat units derived by weight 0 to 45 percent from the condensation of hexamethylene diamine and adipic acid, 0 to 65 percent from the condensation of hexamethylene diamine and polymethylene diacid of 10 to 12 carbons, and 20 to 75 percent from 6-aminocaproic acid, and has a melting point of less than 170° C.; the vinyl ester is vinyl acetate; and the alcoholyzed ethylene/vinyl acetate copolymer is present in the amount of 2 to 75 percent by weight, based on the polyamide.

3. The method of powdering of claim 2 in which the polyamide contains repeat units derived by weight 0 to 35 percent from the condensation of hexamethylene diamine and adipic acid, 5 to 50 percent from the condensation of hexamethylene diamine and polymethylene diacid of 10 to 12 carbons, and 25 to 65 percent from 6-aminocaproic acid, and has a melting point of less than 150° C.

4. The method of powdering of claim 3 in which the ethylene/vinyl acetate copolymer is 75 to 100 percent alcoholyzed and, before being alcoholyzed, contained 75 to 95 mole percent ethylene and 5 to 25 mole percent vinyl acetate and is present in the amount of 3 to 50 percent by weight, based on the polyamide.

5. A finely divided polymer composition having been prepared by grinding said polymer composition at temperatures above brittle fracture which comprises polyamide having a melt index in the range of 0.01 to 2000 and 1 to 100 percent by weight, based on the polyamide, of 50 to 100 percent alcoholyzed ethylene/vinyl ester copolymer which, before being alcoholyzed, contained 75 to 98 mole percent ethylene and 2 to 25 mole percent vinyl ester, said composition having an average particle diameter of 20 to 1000 microns.

6. The composition of claim 5 in which the polyamide has a melt index of 0.1 to 100, contains repeat units derived by weight 0 to 45 percent from the condensation of hexamethylene diamine and adipic acid, 0 to 65 percent from the condensation of hexamethylene diamine and polymethylene diacid of 10 to 12 carbons, and 20 to 75 percent from 6-aminocaproic acid and has a melting point of less than 170° C.; the vinyl ester is vinyl acetate; and the alcoholyzed ethylene/vinyl acetate copolymer is present in the amount of 2 to 75 percent by weight, based on the polyamide.

7. The composition of claim 6 in which the polyamide contains repeat units derived by weight 0 to 35 percent from the condensation of hexamethylene diamine and adipic acid, 5 to 50 percent from the condensation of hexamethylene diamine and polymethylene diacid of 10 to 12 carbons, and 25 to 65 percent from 6-aminocaproic acid, and has a melting point of less than 150° C.

8. The composition of claim 7 in which the ethylene/ vinyl acetate copolymer is 75 to 100 percent alcoholyzed, before being alcoholyzed, contained 75 to 95 mole percent ethylene and 5 to 25 mole percent vinyl acetate, and is present in the amount of 3 to 50 percent by weight, based on the polyamide.

9. The composition of claim 8 in which the average particle size diameter is 100 to 800 microns.

References Cited

UNITED STATES PATENTS

| | | | |
|---|---|---|---|
| 2,473,403 | 6/1949 | Woodward | 260—857 |
| 3,454,512 | 7/1969 | Ahmed | 260—857 |
| 3,464,940 | 9/1969 | Barton | 260—857 |
| 3,472,916 | 10/1969 | Anspon | 260—857 |

FOREIGN PATENTS

| | | | |
|---|---|---|---|
| 1,127,479 | 9/1968 | Great Britain | 260—857 |
| 24,277 | 10/1969 | Japan | 260—857 |

PAUL LIEBERMAN, Primary Examiner

U.S. Cl. X.R.

156—331; 260—37 N, 41 A, 41 C, 78 R, 78 S